United States Patent [19]

Bloch et al.

[11] Patent Number: 5,719,550
[45] Date of Patent: Feb. 17, 1998

[54] ARRANGEMENT FOR IDENTIFICATION OF A MOVABLE OBJECT HAVING A TRANSPONDER

[75] Inventors: Werner Bloch, Eislingen; Roland Ehm, Blaustein; Axel-Michael Frühwald, Filderstadt; Valentin Häutle, Stuttgart; Johannes Hecht, Burlafingen; Dietbert Kollbach, Esslingen; Peter Robitschko, Sindelfingen; Christian Schenk, Blaustein; Hardy Strobel, Wimsheim, all of Germany

[73] Assignees: Licentia Patent Verwaltungs-GmbH; Mercedes Benz AG, both of Germany

[21] Appl. No.: 447,227

[22] Filed: May 22, 1995

[30] Foreign Application Priority Data

May 20, 1994 [DE] Germany .................. 44 17 688.0

[51] Int. Cl.⁶ ............................................ B60R 25/10
[52] U.S. Cl. ................ 340/426; 340/568; 340/573; 340/825.54; 307/10.2; 180/287; 342/44; 342/448
[58] Field of Search .................... 340/426, 428, 340/429, 430, 425.5, 988, 989, 991, 505, 571, 568, 572, 825.36, 825.49, 825.54, 573; 307/10.2, 10.3, 10.4, 10.5, 10.6; 180/287; 342/42, 44, 457, 448

[56] References Cited

U.S. PATENT DOCUMENTS

| | | | |
|---|---|---|---|
| 4,207,468 | 6/1980 | Wilson | 250/341 |
| 4,651,157 | 3/1987 | Gray et al. | 340/426 |
| 4,728,922 | 3/1988 | Christen et al. | 340/991 |
| 4,818,998 | 4/1989 | Apsell et al. | 342/44 |
| 4,908,629 | 3/1990 | Apsell et al. | 342/457 |
| 5,153,583 | 10/1992 | Murdoch | 340/512 |
| 5,160,915 | 11/1992 | Kiss | 340/552 |
| 5,245,346 | 9/1993 | Nishimura et al. | 342/42 |

FOREIGN PATENT DOCUMENTS

| | | |
|---|---|---|
| 2534205 | 4/1984 | France . |
| 2619944 | 3/1989 | France . |
| 2268031 | 12/1993 | United Kingdom . |

OTHER PUBLICATIONS

V4050, Advance Information, EM Microelectronic-Marin SA @1994 EM Microelectronic-Marin SA.

e5550 Data Sheet (Preliminary) TEMIC Telefunken/Eurosil Semiconductor, pp. 1-16.

Bosch Vehicle security systems, 94/95 Robert Bosch BmbH Automotive Equipment Aftermarket Division.

*Primary Examiner*—Jeffery Hofsass
*Assistant Examiner*—Nina Tong
*Attorney, Agent, or Firm*—Spencer & Frank

[57] ABSTRACT

An arrangement for identifying a movable object includes a transponder disposed on the movable object and including an electrical memory that can be read out in a wireless manner by an electrical interrogating device which is disposes in proximity of the object. A sensor arrangement is disposed on the object and electrically linked to the transponder for writing a read-out-capable status information into the memory in response to irregular or unauthorized use of the object.

4 Claims, 1 Drawing Sheet

5,719,550

ARRANGEMENT FOR IDENTIFICATION OF A MOVABLE OBJECT HAVING A TRANSPONDER

CROSS-REFERENCE TO RELATED APPLICATIONS

The present application claims priority with respect to application No. 44 176 688.0 filed in Germany on May 20, 1994, the disclosure of which is incorporated herein by reference.

BACKGROUND OF THE INVENTION

The present invention relates to a movable object having a transponder provided with an electrical memory, the contents of which can be read out in a wireless manner by an electical interrogating device which is disposed in proximity of the movable object.

German Published Examined Application DE-OS 29 19 753 describes a device for the identification of an object, wherein the device comprises a transponder and an associated interrogating device for wireless read-out of the information which is stored in the transponder's memory. The use of such device for a motor vehicle for the purpose of motor vehicle identification is also known from the cited publication.

UK Patent Application GB 2 268 031 A describes an automobile sensing and communicating transponder and an interrogating device for wireless interrogation of information stored in an electrical memory of the transponder.

In view of the increasing number of property offenses on the one hand and an increase in the number of movable objects of high value, such as motor vehicles, the detection of property offenses is increasingly important.

SUMMARY OF THE INVENTION

It is an object of the present invention to allow or to facilitate detection of a unauthorized use of an object essentially without additional information being available.

The above and other objects are accomplished according to the invention by the provision of an arrangement for identifying a movable object, comprising: a movable object; a transponder disposed on the movable object and including an electrical memory that can be read out in a wireless manner by an electrical interrogating device which is disposed in proximity of the object; a sensor arrangement diposed on the object and electrically linked to the transponder for writing a read-out-capable information into the memory in response to irregular or unauthorized use of the object.

An essential advantage of the invention is that an object that is recognized as being conspicuous, can be examined by the interrogating device without necessitating, for example, a time consuming data comparsion. This means that the device according to the invention can be used, for example, for vehicles, without a disturbing loss of time. Thus, it can be detected that a use of a vehicle took place under unusual circumstances, for example, by means of manipulation of the ignition, the locks or the like, independently of the specific vehicle involved. This determination and others can be made once the vehicle has been recognized as being conspicious. This is of importance, for example, if an unlawfully appropriated vehicle, the theft of which has not even yet been detected, is taken across a border.

The invention is explained in greater detail below on the basis of an embodiment which is schematically described in the accompanying drawings.

DETAILED DESCRIPTION OF THE PREFERRED EMBODIMENTS

Figure 1:
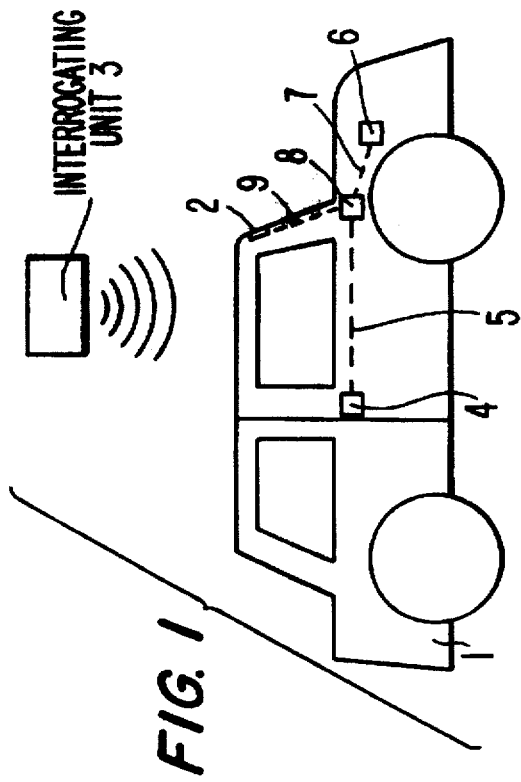
FIG. 1 is a schematic side elevation showing an embodiment of the invention.

FIG. 1 shows a motor vehicle 1 having a transponder 2 as well as an interrogating unit 3 which is used outside of the vehicle for investigative purposes. Transponder 2 includes an electrical memory.

Interrogating unit 3 includes a radio-frequency energy transmitter utilized in a known manner for a wireless supply of energy to and the activation of transponder 2, and a receiver to receive and evaluate the radio-frequency response signal which is emitted by the activated transponder 2.

Transponder 2 is mounted in a hidden manner, for example, in a region where the windshield of vehicle 1 is fastened. Transponder 2 is linked via one signal connection or a plurality of signal connections 5, 7, 9 to a sensor arrangement comprising one or several sensor devices 4, 6 or a coding unit 8, in which several signal connections 5, 7 converge, so that sensor signals transmitted by the sensor devices via these signal connections 5, 7, 9 leave read-out-capable status information in the memory of transponder 2.

The signal connections, 5, 7, 9 may be wire connections, optical waveguides or wireless transmission paths. The sensor devices may be, for example, electrical or electronic devices which emit signals in case of irregular or unauthorized operation of the ignition circuit, the locks, the brake circuit, etc. or in response to a movement prevention device or inexplicable tilting movements of the vehicle, etc..

The transponder may contain one memory or memory component or a plurality of memories or memory components. In general, there will be one memory containing a fixed information identification like the vehicle-specific data and a further memory or memory component which is occupied by the status information derived from the sensor signals of the described sensor devices.

The sensor signals transmitted by the sensor devices via connections 5, 7 may be binary signals and may be combined in a logic OR-device as coding unit 8 to provide a further binary signal, which is transmitted to the transponder via connection 9 and stored in the electrical memory 14 as a status information. The status information may be a binary information, too, with one state indicating correct authorized use of the object and the other binary state indicating a conspicious situation.

In a more sophisicated embodiment the coding unit may combine signals from sensor devices into a more complex signal to be transmitted to transponder 2 and may even cooperate with a clock and a positioning system to create status information containing additional data about date, time and location of an event of unauthorized use.

Figure 2:
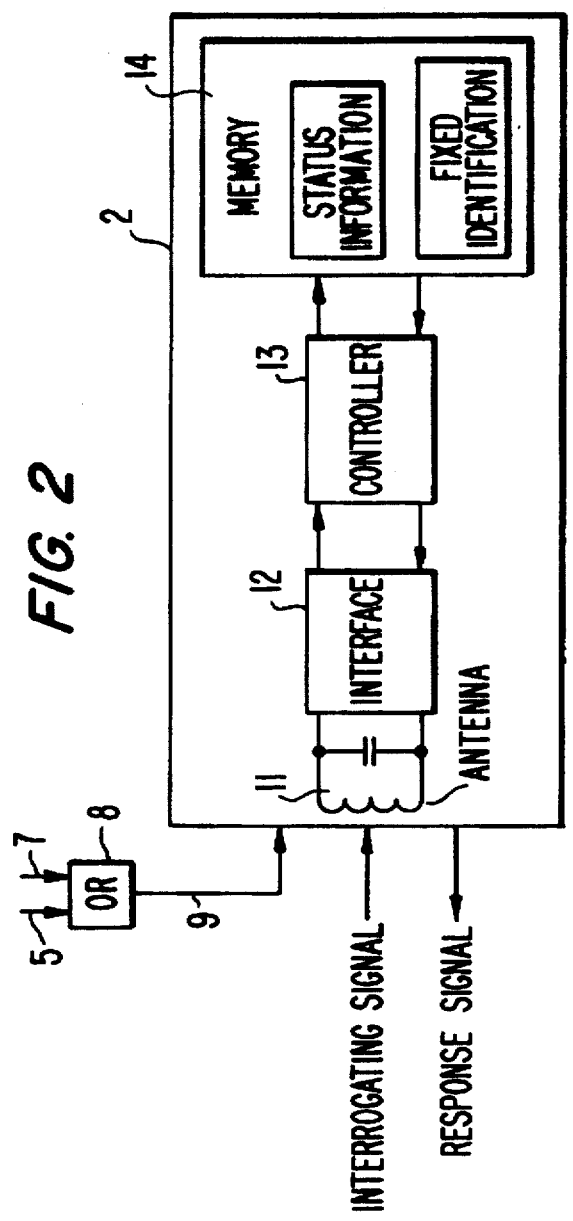
FIG. 2 is a block circuit diagramm of a transponder.

The transponder shown in FIG. 2 may comprise an inductive antenna 11, an interface 12, a controller 13 and a memory 14. The fixed information and the status information will have different memory adresses. Each memory component may include a plurality of memory blocks. Instead of a common receive-transmit-antenna 11, two separate antennae may be provided. Preferably different frequencies are employed for the interrogating signal and the response signal.

Preferably, the signal transmitted by coding unit 8 via connection 9 is coupled inductively to the transponder via antenna 11. Interface 12 receives a write signal from coding unit 8 or an interrogating signal from the interrogating device and activates the electronic circuitry of the transponder. In case of a write signal received from coding unit 8 a status information is written into memory 14, indicating irregular or unauthorized use of the object.

In case of an interrogating signal received from the interrogating device, the fixed information and the status information are read out from memory 14 and are employed for modulating a response signal that is transmitted via antenna 11 to the interrogating device. Controller 13 controls the various functions of the elctronic cicuitry such as read/write access to memory 14, decoding of received data and modulating a response signal.

Suitable transponder devices are available as V4050 of EM MICROELECTRONIC-MARIN, Switzerland or as e5550 of TEMIC, Germany.

Sensor devices or arrangements suitable for the present invention are commonly known from the already used alarm systems with acoustic signalling. Systems of this type are available, for example, as Bloctronic vehicle security systems of BOSCH, Germany, including electronic cicuitry suitable for coding unit 8.

Even though the invention has been described in connection with a preferred application in a motor vehicle, it can also be used advantageously for other objects which should not be utilized in an unauthorized manner, e.g., art objects and the like.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. An arrangement for identifying a movable object, comprising:

a movable object;

a transponder disposed on the movable object and including an electrical memory that can be read out in a wireless manner by an electrical reading device which is disposed in proximity of the object, the transponder using a wireless supply of energy obtained from radio-frequency energy transmitted by the electrical interrogation device for activating the transponder and reading out the electrical memory; and a signal transmitter disposed on the object and electrically linked to the transponder for writing a read-out-capable identification into the memory in response to irregular or unauthorized use of the object.

2. The arrangement according to claim 1, wherein the transponder is disposed in a hidden location on or in the object.

3. The arrangement to according to claim 1, wherein the memory includes a memory component containing an object-specific fixed identification which can be additionally read out.

4. The arrangement according to claim 1, wherein the object comprises a vehicle and the sensor arrangement comprises an electronic anti-use device connected to the transponder by at least one of a wireless connection and a wire.

* * * * *